United States Patent [19]

Schmid

[11] 4,177,508
[45] Dec. 4, 1979

[54] APPARATUS FOR BALANCING AN ASYMMETRICAL LOAD

[75] Inventor: Eberhard Schmid, Dormitz, Fed. Rep. of Germany

[73] Assignee: Siemens Aktiengesellschaft, Munich, Fed. Rep. of Germany

[21] Appl. No.: 879,590

[22] Filed: Feb. 21, 1978

[30] Foreign Application Priority Data

Feb. 25, 1977 [DE]  Fed. Rep. of Germany ....... 2708305

[51] Int. Cl.² ............................................ H02J 3/26
[52] U.S. Cl. ....................................... 363/78; 363/37
[58] Field of Search ...................... 363/78, 79, 74, 95, 363/96, 34, 36–37, 41, 136

[56] References Cited

U.S. PATENT DOCUMENTS

| | | | |
|---|---|---|---|
| 3,551,778 | 11/1968 | Ekstrom | 363/79 |
| 3,768,001 | 10/1973 | Thorborg | 363/96 X |
| 3,980,941 | 9/1976 | Griebel | 363/138 |

Primary Examiner—J. D. Miller
Assistant Examiner—Peter S. Wong
Attorney, Agent, or Firm—Kenyon & Kenyon

[57] ABSTRACT

Apparatus for use in balancing an asymmetrical load which is supplied from a three-phase network. The apparatus is provided with a self commutating converter for generating a three-phase output current system on its a-c side which is fed with phases reversed to the network. The d-c side of the converter, in turn, is fed from a d-c source with a d-c current corresponding to the maximum asymmetry power to be balanced. The apparatus is further provided with a control device which includes a first control means having a pulse program for firing and extinguishing the valves of the converter; and a second control means responsive to the a-c voltage and a-c current of the three-phase network for determining the phase and amplitude of the required countercurrent system and for controlling the pulse widths of the pulses of the program of the first control means to effect a change in the amplitude of the fundamental of the converter three phase output current system in dependence on the determined amplitude of said counter current system and for controlling the phase of the pulse program relative to the zero crossings of the a-c voltage of the network to effect a change in the phase of the fundamental of the three phase output current system in dependence on the determined phase of the countercurrent system.

10 Claims, 14 Drawing Figures

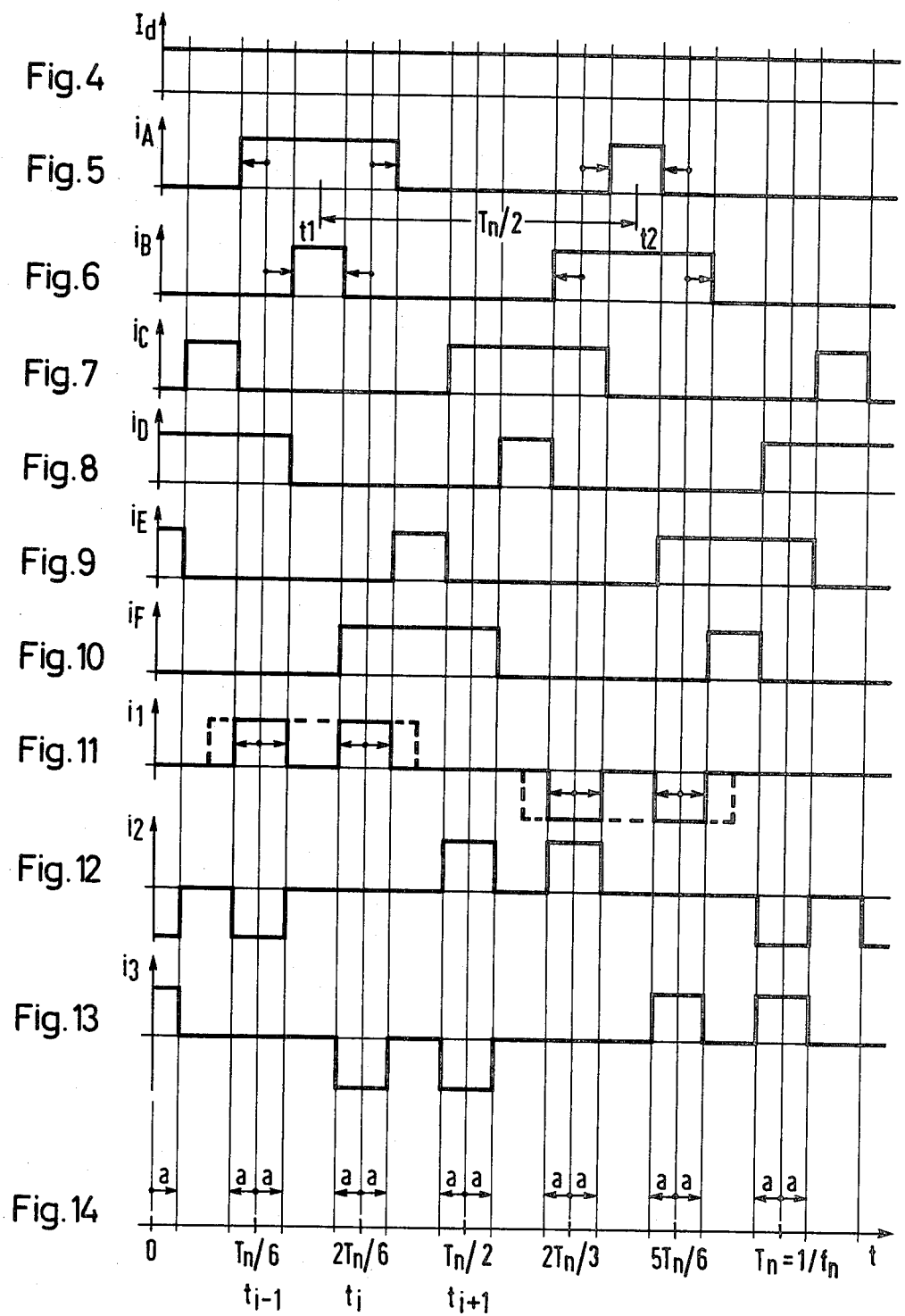

APPARATUS FOR BALANCING AN ASYMMETRICAL LOAD

BACKGROUND OF THE INVENTION

1. Field of the Invention

The invention relates to apparatus for balancing an asymmetrical load which is fed from a three-phase network.

2. Description of the Prior Art

Balancing devices of the above type are known in the prior art. One particular type of device comprises a self-commutating converter which is adapted to be connected on its a-c side with its phases interchanged to the three-phase network and on its d-c side to a d-c source. The converter includes controlled valves which are arranged in a three-phase bridge circuit, have provisions for forced quenching and are controlled such that an output current is generated having a line-frequency fundamental whose phase relative to the phase of the network a-c voltage and whose amplitude are dependent on the phase and the amplitude of the countercurrent system required for balancing. This type of balancing device is disclosed in the German Offenlegungsschrift No. 2,247,819.

In order to avoid or minimize reactions on the three-phase network due to an asymmetrical load, such as, for example, an arc melting furnace, the reactive power of the load must be compensated and the asymmetrical distribution of the active load over the individual network phases must be balanced. As the reactive power and the asymmetry of the load can change almost instantaneously, the apparatus used for compensating and balancing must have a control time in the range of milliseconds so as to be able to adequately regulate the rapidly changing reactive power and asymmetry.

As is well known, the system of currents caused in a three-phase network by an asymmetrical three-phase load can be resolved into a symmetrical corotating and a symmetrical counter-rotating current system. If a corresponding corotating current system is fed into the three-phase network, the reactive power due to the load can be compensated. Furthermore, by feeding-in a corresponding counterrotating current system, the asymmetry power of the load can be compensated. Operation of the above-mentioned balancing device of German Offenlegungsschrift No. 2,247,819 is based on the aforesaid principles.

More particularly, in the known balancing device of German Offenlegungsschrift No. 2,247,891, a self-commutating converter is connected to the three-phase network with its phases interchanged via a transformer. The d-c source supplying d-c current to the converter is further in the form of a line-commutated converter connected to a smoothing choke. Both the line-commutated and the self-commutating converters are timed by the line frequency. As a result, a common measuring arrangement for the reqired countercurrent system can be provided for the line-commutated and the self-commutating converter. With this measuring arrangement, the magnitude of the balancing countercurrent system can be influenced via control of the line-commutated converter and the phase sequence via control of the self-commutating converter.

In this aforesaid known balancing system, if the countercurrent system is to be changed, the output current of the line-commutated converter must be changed via the control pulses thereof. However, the smoothing choke linking the line-commutated converter to the self-commutating converter, due to its appreciable inductance, presents considerable inductive reactance to fast current changes thereby slowing them down. As a result, only relatively slow output current changes of the self-commutating converter can be achieved with a given rated power of the line-commutated converter. If the apparatus is to be capable of handling fast changes in the asymmetry power, then the line-commutated converter must be designed for high voltages and also for large currents; i.e., the converter must be designed for a very large power rating. In such case, the reactive power consumed by the line-commutated converter will be very considerable.

It is an object of the present invention to provide a balancing apparatus for the above type which is designed to permit compensation for rapid asymmetry changes, while not being excessively costly or consuming excessive amounts of reactive current.

SUMMARY OF THE INVENTION

In accordance with the principles of the present invention, the above and other objects are accomplished in a balancing apparatus of the above type by providing that the d-c source feed the self-commutating converter with a constant d-c current which corresponds to the maximum asymmetry power to be balanced, and by further providing therein a control device for controlling the output currents of the self-commutating converter so that the phase and amplitude thereof depend upon the phase and amplitude of the required countercurrent system for balancing. More particularly, the control device includes a first means having a pulse program for controlling the firing and extinguishing of the valves of the self-commutating converter and a second means for determining the phase and amplitude of the required countercurrent system for balancing and for controlling the pulse widths of the pulses of the pulse program of the first means to effect a change in the amplitude of the fundamental of the converter output current in dependence on the determined amplitude for the countercurrent system and for controlling the phase of the pulse program of the first means to effect a change in the phase of the fundamental of the converter output current in dependence on the determined phase for the countercurrent system.

More particularly, in the apparatus of the invention, the d-c current fed into the d-c input of the self-commutating converter remains unchanged during the control process. By changing the "on" time of the self-commutating converter via the change in widths of the pulses of the pulse program, the amplitude of the fundamental of the output current of the self-commutating converter and, therewith, the asymmetry power which is fed into the a-c network connected to the load and is used for balancing, is thereby also changed. In addition, the shift in phase of the converter output current is realized by shifting the entire pulse program in time relative to the voltage of the a-c network.

With the apparatus of the invention so constructed and with the self-commutating converter appropriately designed, the phase of the output current can thus take on any angle in the range from 0° to 360° el. Moreover, with the apparatus of the invention, it is also seen that balancing is realized via pulse width control and phase control of the pulse program of the self-commutating converter. The desired balancing is, therefore, achieved by controlling one and the same converter, thereby, resulting in a high speed of control.

In one embodiment of the invention to be disclosed, the nature of the pulse program is such that the output current per period of the network a-c voltage comprises a symmetrical arrangement of at least 2k=2 adjacent positive current pulses and at least 2k=2 adjacent negative current pulses, each with a controllable total width. More particularly, with the self-commutating converter designed as a six-pulse converter and with K=1, the positive and the negative current pulses are located symmetrically at two points in time one-half a period apart. In this case, the width of each pulse is equal and the total width of each respective adjacent pair, obtained by addition, can be controlled maximally up to one-third of a period. Moreover, the control program can be such that on both sides of and symmetrically to equidistant points in time, at least one valve of the converter is switched into conduction, the "on" time of the switched on valves being controlled in dependence on the magnitude of the asymmetry power to be balanced and the equidistant points in time being adjustable relative to the zero crossings of the network a-c voltage in dependence on the phase of the countercurrent system required for the balancing.

In a three-phase design according to the preceding embodiment, a total of two valve "on" times of different duration can be provided per period of the a-c voltage of the network. Additionally, for reducing the harmonics in the output current of the self-commutating converter, the number of the "on" times could in principle also be more than two, but in such case the switching losses of the self-commutating converter would increase.

In another embodiment of the invention to be disclosed, the d-c source feeding the self-commutating converter is in the form of a line-commutated converter. The latter converter is connected on its a-c side to the three-phase network feeding the load and on its d-c side via a smoothing choke to the terminals on the d-c side of the self-commutating converter. In this case, the d-c output current of the line-commutated converter is regulated to constant output current and the converter comprises controlled valves in a three-phase bridge circuit.

In still another embodiment of the invention to be disclosed, the d-c source is in the form of a choke and the phase of the output currents of the self-commutating converter relative to the a-c voltage of the network is controlled so as to deviate slightly from the value necessary for balancing and so as to ensure a constant d-c current in the choke. This embodiment is based on the fact that it is ultimately immaterial as to how the constant current is generated at the input of the self-commutating converter. Moreover, as is evident, in this embodiment, the self-commutating converter is also utilized for generating the d-c current. However, in this case, the converter consumes a small amount of active power which corresponds to the ohmic resistance of the choke.

With the present invention, a transformer may be arranged between the self-commutating converter and the three-phase network for matching the voltage. Higher-pulse transformer and converter circuits can be used in such case for suppressing certain harmonics.

It is also particularly advantageous with the present invention to employ as the self-commutating converter a converter with phase sequence quenching in which all valves are controlled. This results in low cost.

As can be seen from the above, in the present invention, the entire impressed d-c current is not itself controlled in dependence on the required asymmetry power, contrary to the above-described known apparatus of German Offenlegungsschrift No. 2 247 819. Rather, only a smaller or larger fraction of the impressed and, thus, unchanged d-c current is, so to speak, "gated out" per period of the a-c network voltage by means of the self-commutating converter and is utilized for the asymmetry power generated by the load.

With a line-commutated converter used as the d-c source as above described, the converter thus need only be designed for generating the impressed d-c current, but not for following fast current changes. In addition, while the converter must be designed for large currents, it need only be designed for low voltages. Furthermore, its reactive power requirements are reduced. Finally, as above noted, the d-c source can be provided by a choke only, thereby eliminating entirely the cost of the line-commutated converter. Also use of a choke reduces to zero the reactive power required. This is considered as particularly advantageous.

For generating the pulse program of the control unit of the invention known and proven pulse program generators used in conjunction with known pulsed inverters can be employed.

The term "three-phase network" as used herein is intended to include generally an n-phase network, where n=3,4, ..., i.e., is an integral number larger than 2.

BRIEF DESCRIPTION OF THE DRAWINGS

The above and other features and aspects of the present invention will become more apparent upon reading the following detailed description in conjunction with the accompanying drawings, in which:

FIG. 4 shows a typical waveform of the d-c current delivered by the d-c source of the apparatus of FIGS. 1 and 3;

FIGS. 5 to 10 illustrate timing diagrams which show the firing distribution and the current conduction periods of the individual valves of the self-commutating converter employed in the apparatus of FIGS. 1 and 3;

FIGS. 11 to 13 show the waveforms of the three output currents of the self-commutating converter employed in the apparatus of FIGS. 1 and 3 and;

FIG. 14 is a time axis with equidistant subdivisions for providing a time reference for the diagrams and waveforms of FIGS. 4–13.

DETAILED DESCRIPTION

Figure 1:
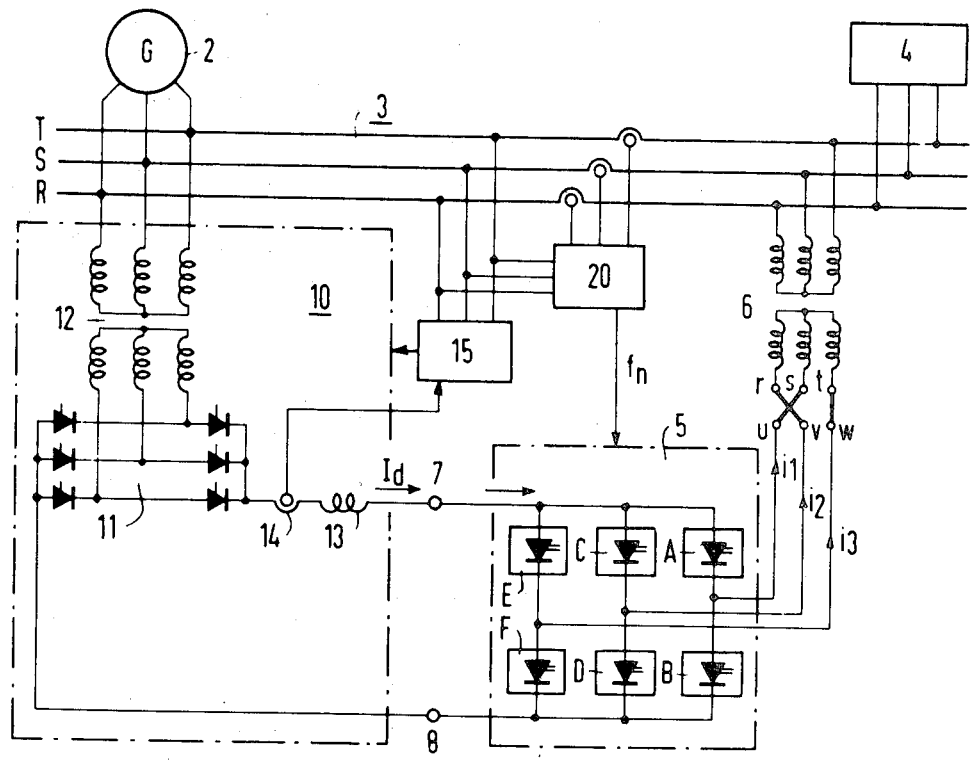
FIG. 1 shows a first embodiment of an apparatus for balancing an asymmetrical load in accordance with the invention wherein a line-commutated converter is provided as the d-c source.

In FIG. 1, a three-phase generator 2 feeds, via the phase conductors R, S, T of a three phase network 3, an asymmetrical load 4 with an a-c voltage of frequency $f_n = 1/T_n$. As illustrated, the load 4 is an inductive three-phase load. The load 4, however, may also be, for example, an arc melting furnace which is connected between only two of the phase conductors R, S, T.

The load 4 is also supplied asymmetry power from a balancing device which is arranged between the load and the three-phase generator 2. The balancing device is designed so that it substantially compensates for the asymmetry in the power of the three-phase network 3. In particular, the balancing device is designed to respond to rapid changes in the asymmetry and compensate same. To accomplish this the device feeds a countercurrent system into the three-phase network 3 by means of its output currents $i_1$, $i_2$, $i_3$.

Figure 2:
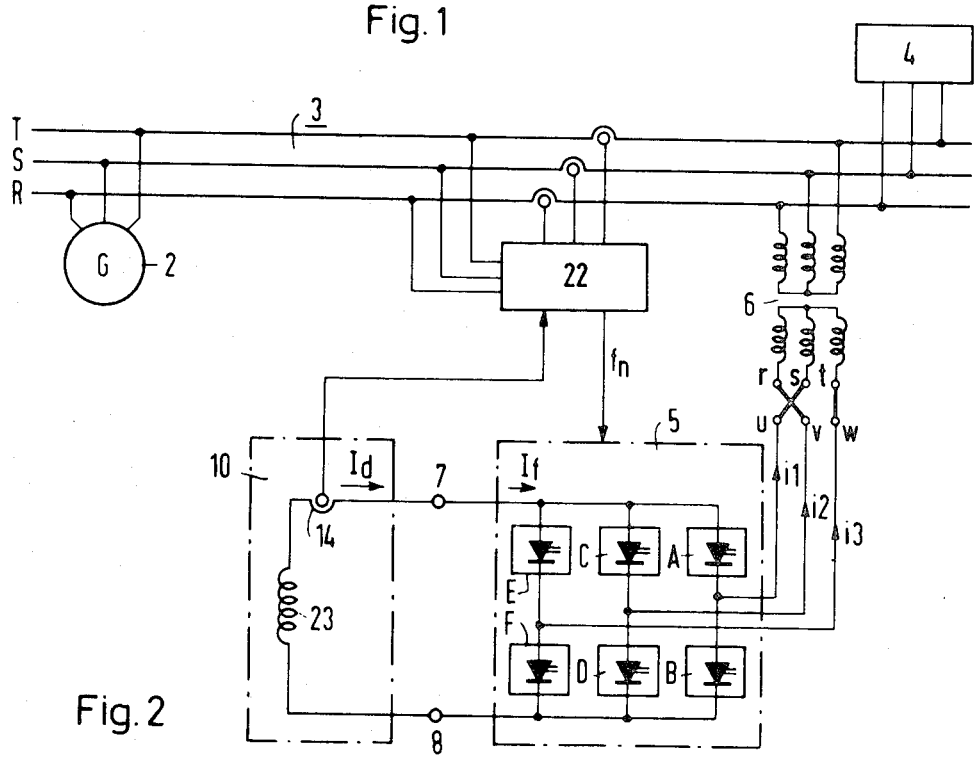
FIG. 2 illustrates a second embodiment of an apparatus for balancing an asymmetrical load in accordance with the invention wherein a choke is provided as the d-c source.

More specifically, in the embodiment of FIG. 1, the balancing device comprises a self-commutating converter 5 having p=6 controlled valves A to F arranged in a three-phase bridge circuit. The groups of valves A, B and C, D and E, F are arranged in respective opposite bridge arms and all the valves A to F can be switched on individually and can be extinguished forcibly. Typically, each of the valves A to F may include a main thyristor, across which is shunted a series connected quenching capacitor and a quenching thyristor. Such valves are disclosed in the German Offenlegungsschrift No. 2 247 819 and, in particular, are shown in FIG. 2 thereof. Other self-commutating converters may also be employed as the converter 5 as will be discussed further in connection with FIG. 3.

The output terminals u, v, w of the converter 5 on the a-c side are connected to the terminals r, s, t of a transformer 6 in Y—Y connection, such connection being provided for the purpose of voltage matching and being such as to interchange the phase sequence. In particular, as shown, the output terminal u is connected to the terminal s and the output terminal v to the terminal r. Furthermore, the two terminals w and t are connected to each other. Due to this interchange of the phase sequence, the converter 5 is capable of furnishing, depending on the amplitude of the line-frequency fundamentals of the output currents $i_1$, $i_2$, $i_3$ and the position in time of its control pulses, an arbitrarily adjustable symmetrical countercurrent system with a direction of rotation opposite to the phase sequence of the rotating-voltage network 3, i.e., a countercurrent system adjustable in phase between 0° and 360° el. as is required for balancing the load 4.

It should be also pointed out that the aforesaid interchange of the phase sequence of the converter 5 can be achieved electrically by changing the valve firing sequence. Furthermore, for suppressing certain harmonics, the transformer 6 can be modified so as to be a multipulse circuit.

A d-c source 10 is connected to the two terminals 7 and 8 on the d-c side of the self-commutating converter 5. The d-c source supplies an impressed d-c current $I_d$ which corresponds to the maximum asymmetry power to be compensated by the balancing device and is kept constant by a current regulator circuit (not shown). In the embodiment of FIG. 1, the source 10 comprises a line-commutated converter 11 having controlled valves arranged in a three-phase bridge circuit. The a-c side of the converter 11 is connected, via an input transformer 12 in Y—Y connection, to the three-phase network 3, while the d-c side of the converter is connected via a smoothing choke 13, to the terminals 7, 8. Firing pulses for the controlled valves of the converter 11 are, in turn, furnished by a control unit 15, which is fed by the three-phase network 3 and is synchronized thereto.

For measuring the d-c current $I_d$ delivered by the source 10, a current measuring device 14 forming part of the current regulator is provided. The converter 11 of the source 10, moreover, while it must be designed to provide the full d-c current $I_d$, need only be designed for low power.

A further control unit 20 is provided for controlling the self-commutating converter 5. The control device 20 comprises a conventional measuring arrangement or first means for determining the required countercurrent system and a control unit or second means including a conventional pulse program generator for providing pulses for driving the valves of the converter 5. In particular, into the control unit 20 is fed as mesurement variables the a-c voltage and the a-c current of the network 3 and, therefrom the measuring arrangement determines the required amplitude and phase for the countercurrent system and, hence, for the fundamental of the output currents $i_1$, $i_2$, $i_3$.

Via the control unit 20 the amplitude of the countercurrent system fed from the converter 5 into the three-phase network 3 can be adjusted by control of the pulse widths of the pulses of the pulse program provided by the pulse program generator of the control unit and the phase of the countercurrent by controlling the phase of the pulses of such program relative to the zero crossings of the a-c voltage of the network 3. This adjustment of the amplitude and phase of the countercurrent system via the unit 20 will be discussed in detail with reference to FIGS. 4 to 14.

FIG. 2 shows a further embodiment of the present invention which is similar to the embodiment of FIG. 1 except that the d-c source of the balancing device has been changed to a simpler design. As shown, in this case the source 10 comprises a choke 23 which is utilized in conjunction with a self-commutating converter 5 which, in turn, is controlled by a control unit 22. The choke 23 connects the two terminals 7, 8 of the converter 5 while the control unit 22 contains as before, a first means or a measuring arrangement and a second means or control unit including a pulse program generator. The control unit 22, however, differs from the control unit 20 in that the phase of the pulse program of the control unit thereof is additionally influenced so that a constant impressed d-c current $I_d$ adjusts itself in the choke 23. In the process, the phase of the output currents $i_1$, $i_2$, $i_3$ of the self-commutating converter 5 with respect to the a-c voltage of the network 3 is shifted relative to the value which would properly be required for exact balancing. This last mentioned value is measured and processed accurately by the control unit 20 (according to FIG. 1), which is comprised by the control unit 22. The shift of the countercurrent system relative to the exact balancing value is slight and amounts to only a few degrees el. Control of the unit 22 to provide the necessary shift of the pulse program is carried out by a current regulator circuit (not shown in detail) which determines, via a measuring circuit, the actual value of the d-c current $I_d$ and couples same to the control unit 22.

Figure 3:
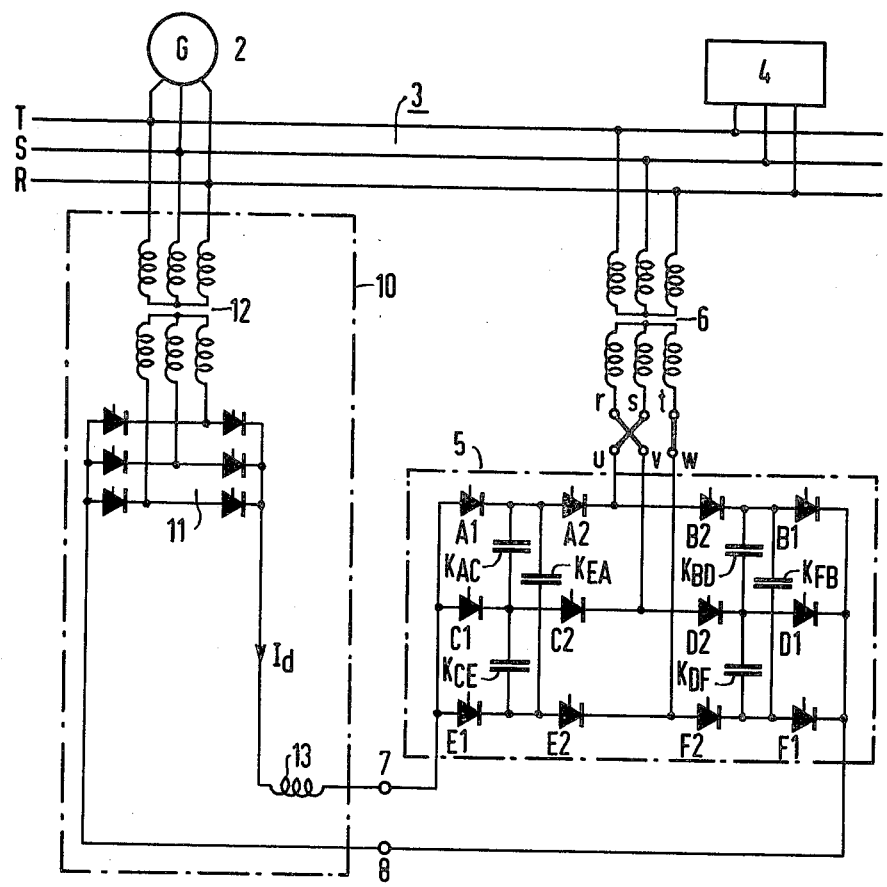
FIG. 3 shows a third embodiment of an apparatus for balancing an asymmetrical load in accordance with the invention.

FIG. 3 shows a third embodiment of the present invention which is also similar to the embodiment of FIG. 1, except for use of a different, more preferable, circuit for the self-commutating converter 5. In this case, the converter 5 is a self-commutating, line-controlled converter which operates with a modified phase sequence quenching system. In particular, the converter 5 is a modified form of a known type of three-phase converter having a bridge circuit. In the latter known converter (see, for example, Proc. IEE, vol. 120, 1973, No. 9, pages 969 to 976), a controlled main valve is connected in series with a diode in each valve branch. In the converter 5, the aforesaid diodes are replaced by controlled valves such as, for example, thyristors, so that all the valves A1 to F2 are controllable. More specifically, in the converter 5 of FIG. 3, the three-phase bridge circuit comprises two bridge halves, each of which includes three valve branches. Each valve branch, in turn, has a series circuit formed from a first controlled main valve A1, B1, C1, D1, E1, F1 and a second controlled main valve A2, B2, C2, D2, E2, F2. The bridge halves further contain three commutating capacitors $K_{AC}$, $K_{CE}$, $K_{EA}$, and $K_{BD}$, $K_{DF}$, $K_{FB}$, respectively, of which each commutating capacitor (for example, the capacitor $K_{AC}$) is arranged between the junction point in one of the series circuits (e.g., A1, A2) of one bridge half and the junction point in another of the series circuits (e.g., C1, C2) of the same bridge half. In this case, the converter 5 is again supplied via a choke 13, with a constant d-c current $I_d$ from a small, line-commutated converter 11.

In the following, the operation of the embodiments of the invention of FIGS. 1 and 3 will be explained in detail by making reference to the diagrams of FIGS. 4 to 14. The embodiment of the invention of FIG. 2 can be similarly operated with minor modifications. More specifically, the diagrams of FIGS. 4 through 13 illustrate the control carried out over the firing of the valves of the converter 5 in order to properly control the resultant countercurrent system to be fed to the a-c network 3. FIG. 14, in turn, provides a time axis t for referencing the time intervals of the diagrams of FIGS. 4–13.

FIG. 4 shows the output d-c current $I_d$ of the source 10 as having a completely horizontal waveform and, hence, as being a constant. Control of the valves A to F of the converter 5 by firing and extinguishing same via a definite pulse program distributes the d-c current $I_d$ cyclically over all three phase outputs of the converter 5.

More particularly, FIGS. 5–10 illustrate the waveforms of the valve currents $i_A$ to $i_F$. These waveforms thus depict the distribution in time and the duration of the current conduction states of the respective valves A to F of the converter 5. As can be seen, each of the valves A to F receives two firing pulses during each period $T_n = 1/f_n$ of the a-c voltage of the network 3. Each valve A to F is thus switched on twice per period $T_n$ and is maintained on for a given length of time. In the present case, the valves are controlled by the pulse program such that the "on" time alternates between a short and a long time interval. After the end of the "on" time determined by the program pulse generator, the respective valve is forcibly extinguished.

As can be further observed from FIG. 5, the longer of the two "on" times is disposed symmetrically to a first point in time t1 and the shorter of the two "on" times is disposed symmetrically to a second point in time t2. The relative positions in time of the points t1 and t2 can be determined from time axis of FIG. 14 wherein the period $T_n$ is subdivided by equidistant points in time $t_i = 0$, $T_n/6$, $2T_n/6$, $3T_n/6 \ldots T_n$ with $i = 0, 1, 2 \ldots$; the latter distribution following the general formula $t_i - t_{i-1} = T_n/(pk) - 1/(pf_n k)$, where p is the number of the pulses of the converter 5, $f_n$ is, as above noted, the line frequency of the a-c network and k is a positive integer. In the present example, the pulse number p is equal to 6 and k is equal to 1. Accordingly, the point $t_1$ is exactly between the times $T_n/6$ and $2T_n/6$, while the point $t_2$ is later in time by $T_n/2$ and is, therefore, exactly between the times $4T_n/6$ and $5T_n/6$. The number 2k indicates the respective selected number of positive and negative current pulses. For another example, k could be chosen as 2, 3, etc.

As can also be seen from FIGS. 5–10, the current conduction programs of the valves of adjacent bridge arms are shifted relative to each other by $T_n/2$. Thus, for example, the valve currents $i_A$ and $i_B$ of FIGS. 5 and 6 illustrate that the control programs of the two valves A and B are identical, but are shifted by half a period, i.e., $T_n/2$. Both valves A and B, therefore, conduct current simultaneously twice during each period $T_n$, each simultaneous conduction lasting for a time equal to the shorter of the two "on" times. This is true also for the two adjacent valves C and D as can be seen from their currents $i_C$ and $i_D$ in FIGS. 7 and 8, as well as for the two valves E and F as can be seen from their currents $i_E$ and $i_F$ shown in FIGS. 9 and 10. Moreover, valve currents of the valve pair C, D and, hence, the control thereof lags that of the valve pair A, B by $T_n/3$ in time, and the valve currents and, hence, control thereof, of the other valve pair D, F leads that of the valve pair A, B by $T_n/3$ in time.

The current distributions of the valves A to F shown in FIGS. 5 to 10 results in the three converter output currents $i_1$, $i_2$, $i_3$ being phase-shifted by $T_n/3$ relative to each other. The waveforms of these currents are shown in FIGS. 11 to 13. Accordingly, as can be seen, two adjacent positive and two adjacent negative current pulses per period, each having a pulse time $2a$, contribute to the fundamental wave of each current. The total pulse time per half-period is equal to $4a$.

The operation of the invention to obtain amplitude control of the fundamental of the currents $i_1$ to $i_3$ and, hence, the countercurrent system will now be explained. More particularly, it is evident from FIG. 14 that on both sides of and symmetrically to the equidistant points in time $t_i = 0$, $T_n/6$, $2T_n/6 \ldots T_n$ with $i = 0, 1, 2, \ldots$ a drive a for the valves occurs. A given drive a, in turn, corresponds to a certain magnitude of the countercurrent system. If a larger amplitude becomes necessary, the drive a is increased, by the control device 20. The firing and extinguishing instants of the individual valves A to F are then shifted in the direction of the horizontal arrows of FIG. 14.

The direction of shift for the firing and quenching of the valves A and B with the drive a increased is indicated by horizontal arrows also in FIGS. 5 and 6. It follows therefrom that the shorter and the longer "on" times can be controlled in opposite directions. It is further evident from FIGS. 5 and 6 that the longer "on" period has the length $(T_n/p) + 2a$ and that the shorter "on" period has the length $(T_n/p) - 2a$, where in the present case p=6. Thus, with increased drive a, the longer "on" time becomes longer and the shorter "on" time becomes shorter. With a maximum drive $a = T_n/12$, the longer "on" time has increased to $T_n/3$ and the shorter "on" time has decreased to 0. With a drive changed to a=0, however, both "on" times become equal and take on the value $T_n/6$. A similar situation can be seen to apply to the "on" times of the currents in FIGS. 7 to 10 with changes in the drive a.

From FIG. 11 it can be further seen that with an increased drive a, the flanks of the individual current pulses are shifted in the direction of the arrows so that the total width $2a$ of each current pulse increases. At the maximum value for the drive a, i.e., at $a=T_n/12$, the two current pulses become a single pulse of width $T_n/3$. This is indicated in FIG. 11 by the two dashed current pulses. The minimum drive a is given by the value $a=0$.

The operation of the invention to change the phase of the currents $i_1$ to $i_3$ and hence, phase of the countercurrent system occurs by shifting the current pulses of FIGS. 10 to 12. In particular all the pulses are shifted forward or back in time together in the same direction by the same amount, as required.

In summary, therefore, it can be seen from FIG. 11 that a countercurrent system with maximum amplitude or magnitude can be fed-in to the network 3 by means of a pulse program which is constructed so that the output current $i_1$ has one positive and one negative current pulse per period $T_n$, said pulses having each a maximum width of $T_n/3$ and having a mutual spacing of $T_n/6$. To reduce the amplitude of the system from this maximum amount the current conduction time in each half-period has to be reduced. This, in turn, can be achieved by subdividing the current pulse in each half-period into a certain number $2k$ of current pulses and by reducing the widths of these current pulses. In this case, k can have a value 1, 2, 3, .... Thus, for example, a subdivision into $2k=2$ current pulses of equal width and symmetrical disposition can be made. This is specially illustrated in FIG. 11. On the other hand, a subdivision into $2k=4$ or more current pulses can also be made. However, it should be noted that with an increasing number $2k$ of current pulses, switching losses increase.

What is claimed is:

1. Apparatus for use in balancing an asymmetrical load which is supplied from a three-phase network comprising:
   a self commutating converter for generating a three-phase output current system on the a-c side and which is adapted to be connected on the a-c side with phases reversed to said network, said converter including controllable valves which are arranged in a bridge circuit and are adapted for forced quenching;
   a d-c source connected to the d-c side of said converter and coupling thereto a constant d-c current corresponding to the maximum asymmetry power to be balanced;
   a control device for controlling said converter such that the phase and amplitude of the fundamental of the three phase output current system thereof are dependent, respectively, on the phase and amplitude of the countercurrent system required for balancing, said control device including:
      a first control means having a pulse program for firing and extinguishing the valves of said converter;
      a second control means responsive to the a-c voltage and a-c current of said network for determining the phase and amplitude of said required countercurrent system and for controlling the pulse widths of the pulses of said program of said first control means to effect a change in the amplitude of the fundamental of said three phase output current system in dependence on said determined amplitude of said countercurrent system and for controlling the phase of the pulse program relative to the zero crossings of the a-c voltage of said network to effect a change in the phase of the fundamental of said three phase output current system in dependence on said determined phase of said countercurrent system.

2. Apparatus in accordance with claim 1 wherein:
   said pulse program results in the currents of said three-phase output current system each having per period $T_n$ of said a-c voltage of said network a symmetrical arrangement of at least $2k=2$ adjacent positive and $2k=2$ adjacent negative current pulses each with the same controllable width $2a$ and having a mutual spacing of $$(t_i - t_{i-1}) = T_n/(p \cdot k)$$

where p equals the number of pulses of said converter and k is a positive integer.

3. Apparatus in accordance with claim 2 wherein:
   k equals 1;
   the positive and negative current pulses are located symmetrically at two points in time spaced one half of said period, $T_n/2$, and have equal widths $2a$;
   and the total width $4a$ of the negative and positive current pulses is controllable maximally to one third of said period, $T_n/3$.

4. Apparatus in accordance with claim 3 wherein:
   said second control means controls said pulse program of said first control means such that at points in time symmetric to and on both sides of equidistant points in time at least one of said valves of said converter is brought into conduction and the "on" time of said conducting valve is dependent on the asymmetry power to be balanced;
   and said second control means controls said pulse program such that the phase of said equidistant points is dependent upon the phase of said required countercurrent system.

5. Apparatus in accordance with claim 4 wherein:
   said pulse program is such that two "on" times of different duration are provided per period $T_n$ for said valves.

6. Apparatus in accordance with claim 1 wherein:
   said d-c source comprises: a line-commutated converter whose a-c side is adapted to be connected to said three-phase network; and a smoothing choke connected to the d-c side of the line-commutated converter;
   and means for maintaining the output current of said line-commutated converter constant.

7. Apparatus in accordance with claim 6 wherein:
   said line-commutated converter comprises controlled valves arranged in a three-phase bridge circuit.

8. Apparatus in accordance with claim 1 wherein:
   said d-c source comprises a choke;
   and said self-commutating converter is controlled such that the phase of its output current deviates slightly from that required by said countercurrent system and such that the d-c current in said choke is constant.

9. Apparatus in accordance with claim 1 wherein:
   said apparatus further comprises:
   a transformer arranged at the output of said self commutating converter.

10. Apparatus in accordance with claim 1 wherein:
   said self-commutating converter is a converter having phase sequence quenching and all controllable valves.

* * * * *